Dec. 27, 1938.  S. E. WHITE  2,141,580
AMUSEMENT AND SKILL GAME
Filed May 18, 1936  2 Sheets-Sheet 1
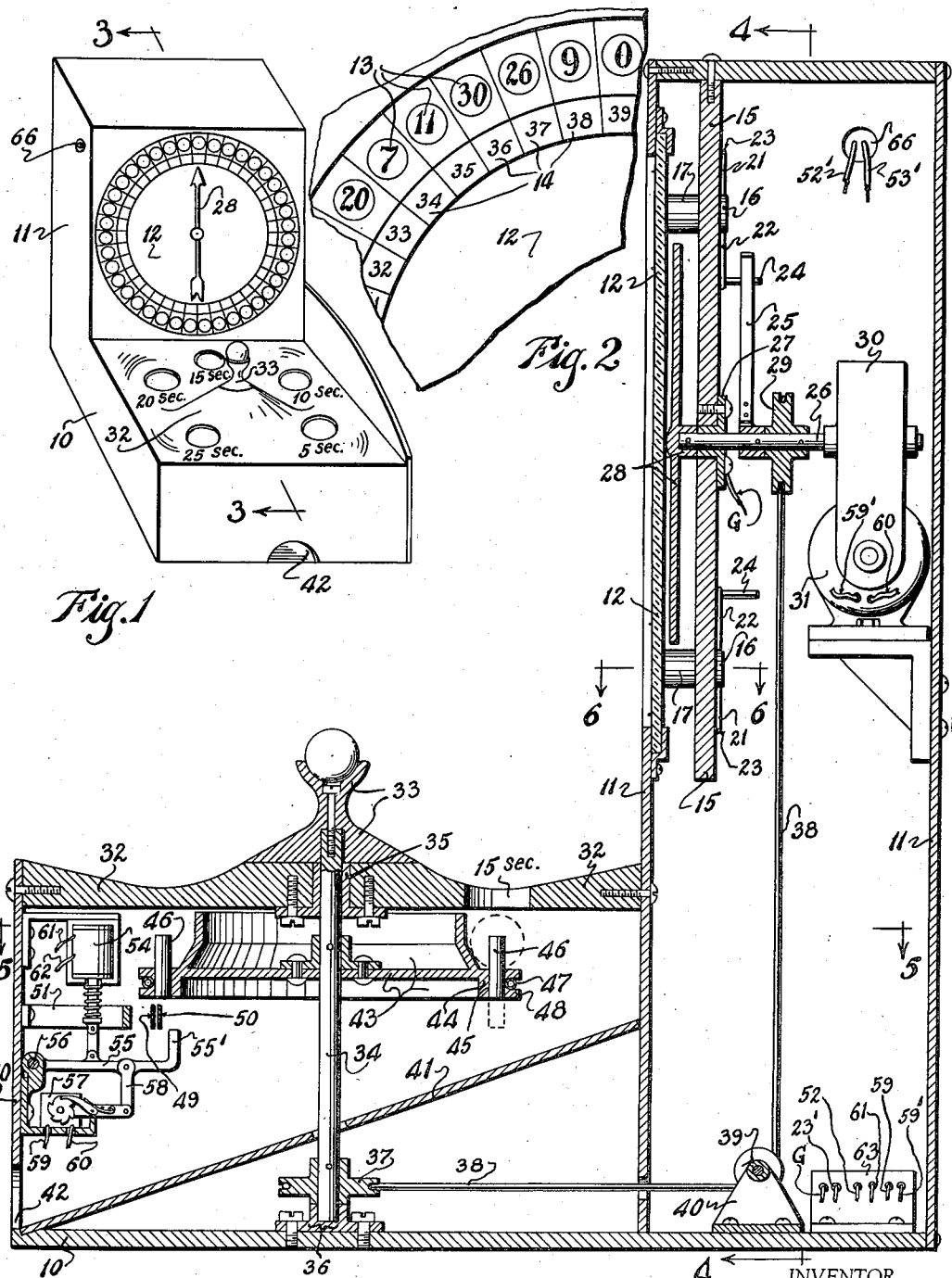
INVENTOR.
Sanford E. White
BY
ATTORNEY.

Dec. 27, 1938.   S. E. WHITE   2,141,580
AMUSEMENT AND SKILL GAME
Filed May 18, 1936   2 Sheets-Sheet 2
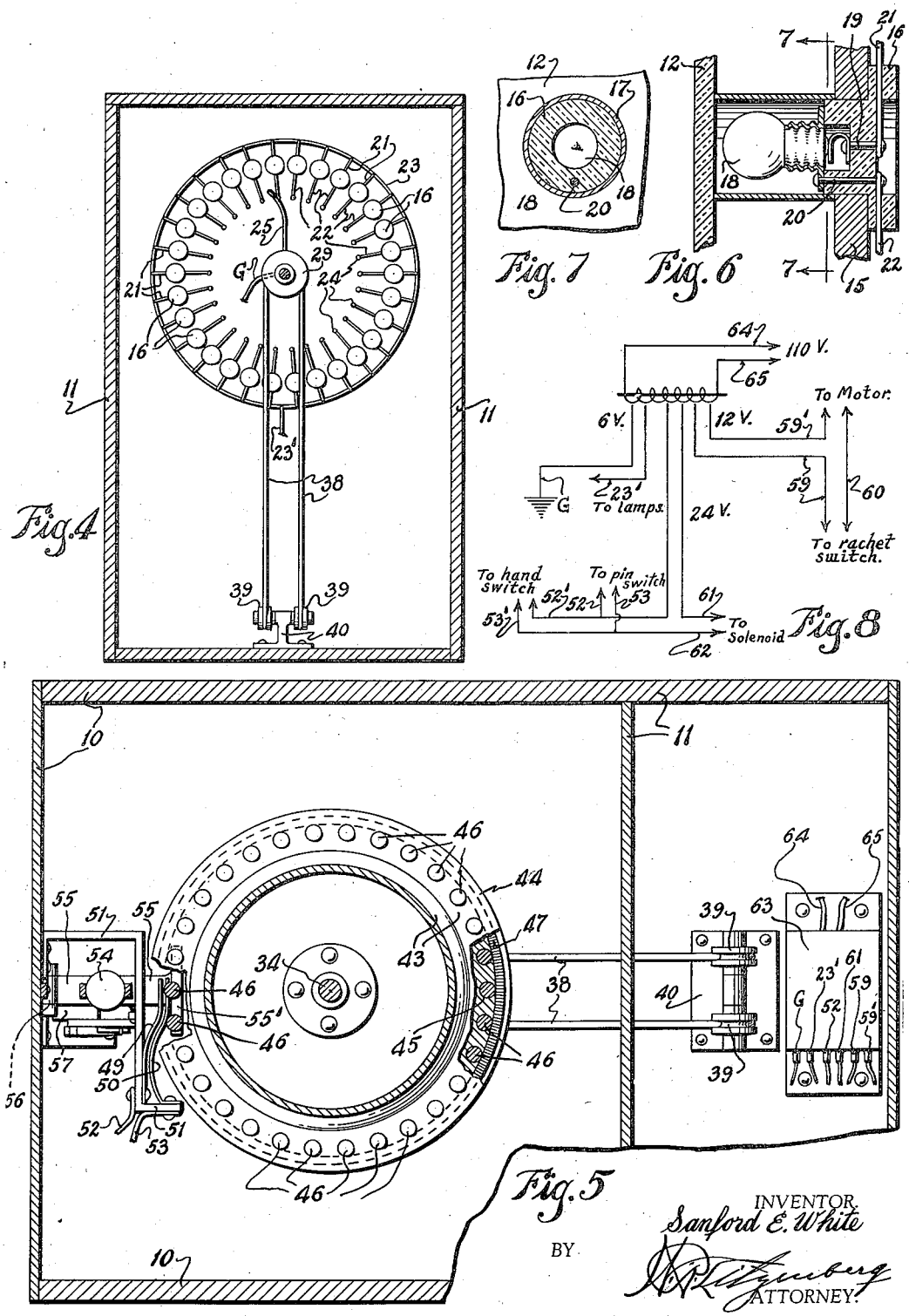
INVENTOR.
Sanford E. White
BY
ATTORNEY.

Patented Dec. 27, 1938

2,141,580

UNITED STATES PATENT OFFICE 2,141,580

AMUSEMENT AND SKILL GAME

Sanford E. White, Santa Monica, Calif.

Application May 18, 1936, Serial No. 80,274

5 Claims. (Cl. 273—95)

My invention relates to an amusement and skill game in which the individual players undertake to toss a ball into a selected opening, which ball, if it enters the opening, actuates a mechanism which controls the operation of the game; to provide a game of the character referred to which has a revolving dial hand or the like adapted to be stopped at a particular point when a tossed ball enters one of the openings provided to receive a ball, the selected opening determining the stopping position of such revolving element; to provide in such a game apparatus a dial having numerals arranged around its border and to which a dial hand successively points, with means whereby a ball tossed through a selected opening will operate to stop the mechanism with the dial hand at a numeral corresponding to the opening selected by the player; to provide in such a mechanism means for successively illuminating the numerals as the dial hand moves from one to the other; to provide in such a mechanism a control whereby the travel time of the dial hand from one numeral to the next numeral is preferably one second, or of regular timed movement, whereby a player can determine the time required for the dial hand to reach the selected numeral corresponding to the number of the opening into which he undertakes to cast a ball; and, in general, to provide an amusement and skill game apparatus affording the player opportunity to test his skill in preselecting an opening into which he proposes to cast a ball and to time it so as to stop the dial hand at that selected numeral if the ball enters the selected opening.

In order to more fully describe my invention, I have illustrated one practical embodiment thereof on the accompanying two sheets of drawings, which I will now describe.

On the drawings:

Figure 1 is a perspective view of a game apparatus embodying my invention, one of the sides and front retaining walls being removed;

Figure 2 is a fragmentary portion of the dial, greatly enlarged to show the arrangement of the numerals around the border of the dial;

Figure 3 is an enlarged, vertical sectional view through the apparatus, taken on the line 3—3 of Fig. 1;

Figure 4 is a vertical sectional view taken on the line 4—4 of Fig. 3;

Figure 5 is a horizontal sectional view taken on the line 5—5 of Fig. 3;

Figure 6 is an enlarged sectional view taken on the line 6—6 of Fig. 3;

Figure 7 is a sectional view taken on line 7—7 on Fig. 6; and

Figure 8 is a wiring diagram for the electrical wiring of the apparatus.

Referring now in detail to the drawings, my invention as here shown is housed in a box-like structure having a horizontal portion 10 and a rear vertical section 11, substantially as indicated in Figs. 1 and 3. The vertical portion or section has an open front provided with a dial 12, preferably of transparent material, and around the border of which are arranged two series of numerals, as 13 and 14, the numerals 14 being numerically arranged around the circumference of the dial and consisting of thirty-nine numerals from 1 to 39, while the series 13 shows numerals miscellaneously arranged in circles, as shown, for such use as may be desired in connection with the operation of the machine.

Supported in the vertical section of the housing is a supporting member 15. Arranged around this supporting member 15, is a series of light sockets, as 16, corresponding in number to the series of numerals arranged around the border of the front of the dial, with a tubular member, as 17, interposed between the lamp sockets 16 and the rear face of the dial, as clearly illustrated in the enlarged sectional view, Fig. 6. A lamp 18, in each of said sockets, has two terminals, as 19 and 20, and these are connected in series by means of the connecting members 21 and 22, and a common connecting ring 23, Fig. 4, the members 22 being provided with projecting contact pins 24, adapted to be successively wiped or engaged by a spring contact member 25, rotatably mounted on a shaft 26. Said shaft 26, has a bearing 27 in the supporting member 15, and carries an arrow 28, a pulley 29, and a worm and gear drive mechanism in the housing 30, well known in the art, and driven by a motor 31. A ground wire G is shown connected to the bearing 27 for the spring contact member 25.

While the dial is transparent, as of clear glass, the series of numerals 13 and 14 are painted on the border of said dial, the series 13 being left transparent within the small circles in which the miscellaneous numerals are placed, and these small circles are in register with the small tubular members 17, for directing the light from the lamps 18 to said numerals successively as the contact spring member 25 moves with the dial hand from one numeral position to the next. Thus each numeral circle is illuminated as the dial hand moves to it. Any number of numerals can be used, but in the present arrangement the mechanism is timed to mark a second from one numeral to the next numeral.

The top of the horizontal portion of the housing is shown to be dished, or rather it has an annular concaved top surface and is designated as a whole 32, and is provided with a series of ball-receiving openings which are designated by the number of seconds represented thereby, namely: 5 sec., 10 sec., 15 sec., 20 sec., and 25 sec., respectively. The central part of said top 32 is provided with a conical-like portion, having a ball-holding cup thereon, and all designated 33, and mounted on the upper end of a shaft 34, having a bearing 35, in said top, and a bottom end bearing 36, as shown. A pulley 37 is mounted on said shaft 34, and is driven by a belt or cable 38, which runs under two guide pulleys 39, 39, in a supporting bracket 40, and thence to the pulley 29 on the shaft 26, before described. Thus from the motor 31, through said belt or cable, 38, said central conical-like portion 33 is driven or revolved. An inclined floor 41 is mounted in said horizontal housing and leads downwardly to an outlet opening 42 in the front of the housing, as shown.

Also mounted on said vertical shaft 34 is a round body member 43, having around its lower end a flange portion 44, provided with a series of holes 45 therethrough, and in which are slidably mounted a series of pins, 46, frictionally held by means of a coiled spring 47, set in an annular groove 48 around the outer edge of said body and bearing against the sides of said pins 46, as will be clear from Fig. 3.

The ball-receiving openings in the top 32, it will be noted, are directly above the pins 46 in said body 43, so that when a ball is tossed through one of said openings, it will engage and depress said pin, as indicated in light broken lines at the right, Fig. 3, after which the ball rolls off on to the inclined floor 41. The tapered form of the wall of said body 43, it will be seen, is such as to cause said ball to be rolled off of the flange portion 44 of said body, as it depresses the pin to the through position, where it projects downwardly from the flange part of said body in the manner indicated. This sets the depressed pin in position to engage and operate a switch, now to be described.

In Figs. 3 and 5, two spring switch members, 49 and 50, are supported in a bracket frame 51, connected by two wires 52, 53, said spring switch members being positioned, as shown, to be moved together by the depressed pins 46, to complete a circuit through wires 52 and 53, hereafter again referred to.

Mounted in said bracket frame 51, is a solenoid 54, having a core connection to a lever 55, pivotally supported at 56, and having its end upturned at 55' in position to engage and push the pins 46 up to their raised or normal positions. A ratchet on-and-off electric switch 57 is also mounted near said lever 55 and is connected therewith by a link 58, whereby the actuation of said solenoid and lever 55, actuates said on and off switch 57, to complete and break a circuit through wires 59 and 60. The wires to the solenoid are designated 61 and 62, Fig. 3, and Fig. 8. The circuit wire or connecting ring 23, connecting the lamp circuits, is connected by wire 23' and the ground wire G.

Mounted in the bottom of the housing is a transformer 63 of standard make, and is connected by wires 64 and 65 to the source of supply of the usual 110 volts. From the transformer three circuits are taken, as indicated in the diagrammatic view, Fig. 8. For example, a 6 volt circuit, wire 23' and ground to the lamps; a 24 volt circuit which includes the solenoid 54, the pin controlled switch 49—50; and to a hand or manually controlled switch, designated 66, on the side of the housing 11, to be operated by the custodian. The wires to this switch are designated 52' and 53'. A 12 volt line runs to the motor 31, and also to the ratchet switch 57. These lines are designated 59, 59' and 60, Fig. 8. As this type of transformer is standard and understood, it is not necessary to further explain it.

Thus I have provided a game apparatus in a housing or casing having a series of ball-receiving openings into which a ball may be cast by the player, with a movable series of movable elements mounted in proximity to said openings, whereby to be engaged and moved by balls passing through said openings, with a dial having one or more series of characters or numerals on its face and a pointing element to designate a particular character or numeral, with operating mechanism to move said parts or elements relative to each other, and with means for stopping said mechanism at preselected times, said means being actuated by the ball-moved element, whereby the player undertakes, by selecting the particular opening into which he tosses a ball, to predetermine the stop position of the mechanism, that is, the particular numeral or character at which the pointing element points when the mechanism stops.

In order to accomplish this, the mechanism is preferably constructed to move with timed regularity so that each step is the same in time as the other steps or movements.

The operation of the apparatus may be briefly described as follows:

Before a player undertakes to toss a ball in a preselected ball-receiving opening in the top surface of the casing, the attendant starts the mechanism by closing the switch at 66. This starts the motor which, in the present embodiment of the invention, revolves the dial hand or arrow 28, and also at the same time causes the lamps 18 to be successively lighted as the spring contact member 25 engages with the contact pins 24, said spring member 25 and the arrow 28 moving together. Suppose now that the dial hand or arrow points to the numeral, 5, in the series designated 13, and the player desires to stop the mechanism with said arrow pointing to the numeral 10. He undertakes to toss the ball in the ball-receiving opening, designated "5 sec." for this will stop the mechanism in five seconds, or in the time it takes the ball-depressed pin to travel to the switch members 49—50 and close them, which stops the motor. The solenoid is operated at the same time, which operates the lever 55 to push the depressed pin 46 up to its normal position. If the operator is watching the movement of the dial hand and desires to stop it at any advanced position or numeral, he undertakes to toss the ball in the opening which represents the number of positions or seconds from the time he tosses the ball to the one desired, that is, if the hand or arrow points to numeral 1, series 14, when he tosses the ball and he wants to stop the hand or arrow at the numeral 25, which is 25 steps or seconds in advance, he tosses the ball into ball-receiving opening designated "25 sec." If successful, the ball will depress one of the pins 46 into operating position and it will, in twenty-five seconds or twenty-five steps, close the switch members 49—50, which will operate the solenoid and stop the motor, returning the depressed pin to its normal position. The attendant must start the machine for each play. The player will, of course, before playing, make known the position at which he proposes to stop the machine and at which character or numeral the arrow will point when the machine stops. The lamp at the corresponding numeral at which the arrow stops will remain lighted for the reason that the lights are on a separate circuit, 23' through lamps to ground G, as described and shown.

I do not, of course, limit the invention to the details of construction and arrangement shown for illustrative and explanatory purposes, knowing that many changes can be made within the scope of the invention, except as I may be limited by the hereto appended claims.

I claim:

1. In a game apparatus, a housing having a series of ball-receiving openings therein, a movable series of individually movable elements adjacent said openings and adapted to be engaged and moved by a ball passing through one of said openings, a dial element having thereon a series of characters, a pointing element associated with said dial element for indicating a particular character on said dial element, means for revolving one of said last two elements relative to the other, and means for stopping said operation at preselected times, said means being controlled by a ball-moved element.

2. In a game apparatus, a housing having a series of ball-receiving openings therein in a horizontal position, a movable series of individually movable elements adjacent said openings and adapted to be moved by a ball entering one of said openings, a dial having thereon a series of characters, a dial hand associated with said dial to point to said characters, means for revolving said dial hand, and means for stopping said dial hand at preselected positions, said last means being adapted to be operated by a ball-moved element.

3. In a game apparatus, a housing having a series of ball-receiving openings, a dial with a series of characters arranged thereon, a dial hand associated therewith to point successively to said characters, a motor with connections for revolving said dial hand, a body rotatably mounted in said housing and connected to be driven by said motor, said body having a series of stop elements movably mounted thereon and adapted to be set to stop position by a ball passing through a ball-receiving opening, means for returning said stop elements to normal positions, and means for stopping said motor and said dial hand at preselected positions relative to said dial characters, said means being adapted to be controlled by said ball-moved stop element.

4. In a game apparatus, a housing having a series of ball-receiving openings thereinto, a revoluble member having a series of movable stop elements thereon adjacent said openings, whereby a ball passing through one of said openings will set one of said stop elements, a motor for driving said revoluble member, a dial having indicating characters thereon, a dial hand associated with said dial for pointing to said characters, connections from said dial hand to said motor, electric means for returning said ball-moved stop elements to their normal positions, and means adapted to be actuated by said stop elements for stopping said motor and said dial hand, the particular stop element set determining the stop position of said dial hand relative to said dial.

5. A game apparatus including a housing having ball-receiving openings therein, a revoluble member in said housing having stop elements therein adapted to be set to stop positions by the engagement therewith of a ball entering one of said openings, said stop elements having means yieldingly holding them in normal or moved positions, electrically operated means for returning said elements to normal positions, a motor for revolving said revoluble member, a dial, a dial hand associated with said dial for indicating positions thereon, operating connections from said motor for causing a revolving movement relatively between said dial and dial hand, and means adapted to be operated by said stop elements when set by a tossed ball for stopping said motor and said revolving member, and for causing the actuation of the means for returning said stop elements to normal position.

SANFORD E. WHITE.